United States Patent [19]
Mogensen et al.

[11] 3,891,562
[45] June 24, 1975

[54] ARRANGEMENT IN A REACTOR FOR PLASMA-CHEMICAL PROCESSES

[75] Inventors: Palne Mogensen, Jarfala; Mats J. Kaij, Solna, both of Sweden

[73] Assignee: AGA Aktiebolag, Sweden

[22] Filed: Oct. 9, 1973

[21] Appl. No.: 404,657

[30] Foreign Application Priority Data
Oct. 13, 1972 Sweden .................... 13196/72

[52] U.S. Cl. ............ 250/547; 250/542; 204/171; 313/231.5
[51] Int. Cl. .................... C22d 7/08; C07c 3/24
[58] Field of Search ............ 204/171; 250/531, 542, 250/543, 547

[56] References Cited
UNITED STATES PATENTS

| | | | |
|---|---|---|---|
| 3,049,488 | 8/1962 | Jackson et al. | 250/531 |
| 3,079,325 | 2/1963 | Butenuth et al. | 250/547 |
| 3,400,070 | 9/1968 | Naff | 250/530 |
| 3,503,711 | 3/1970 | Skala | 23/232 |
| 3,514,264 | 5/1970 | Sennewald et al. | 23/284 |
| 3,515,519 | 6/1970 | Sennewald et al. | 23/284 |
| 3,647,676 | 3/1972 | Bersin | 250/531 |
| 3,706,652 | 12/1972 | Hamblyn et al. | 250/531 |

Primary Examiner—John H. Mack
Assistant Examiner—Aaron Weisstuch
Attorney, Agent, or Firm—Lerner, David, Littenberg & Samuel

[57] ABSTRACT

An improvement in reactors for plasma-chemical processes is provided, where the arc-chamber includes electrodes for the transmission of an arc therethrough, and a supply of a plasma gas is forced through the arc, which includes injection means for supplying the reactants to a reactor, and into the plasma gas stream. The reactor may be a single reactor or a series of reactors, and may also include a cooling chamber or series of cooling chambers, downstream therefrom, the cooling chambers also including injection means for supplying coolant to the stream of plasma gas, now including reactor products. In a preferred embodiment, a series of nozzles within both the reaction chamber and cooling chamber, injects both the reactants and coolant, respectively, into these chambers tangentially to the plasma gas streams. Where a series of reactors and cooling chambers are utilized, the tangential flow in each successive reactor alternates in a clockwise and counter-clockwise direction, to achieve maximum mixing.

4 Claims, 2 Drawing Figures

ARRANGEMENT IN A REACTOR FOR PLASMA-CHEMICAL PROCESSES

FIELD OF THE INVENTION

The present invention relates to improvements in reactors for plasma-chemical processes, such as the cracking of hydrocarbons for the manufacture of acetylene and other products, where such reactors include arc-chambers containing electrodes, between which burns an arc, and means for forcing a plasma gas, such as hydrogen or other suitable gas mixtures, through the arc in the arc-chamber. More specifically, the present invention relates to improvements in both the reaction occurring within the reactor, and the subsequent cooling of the reactor products.

BACKGROUND OF THE INVENTION

It has been known to utilize reactors including arc-chambers containing electrodes, between which burns an arc, for various plasma-chemical processes, such as the cracking of various hydrocarbons for the manufacture of acetylene, and other materials. These reactors have also included a plasma gas stream, typically hydrogen or other gas mixtures, which is forced through the arc in the reactor. In employing such reactors, it is essential that the most efficient mixing possible be achieved between the plasma gas stream and the reactants as they are introduced into the reactor. It is also essential that the reaction products passing from the reactor receive the most efficient cooling possible in the shortest possible time, or as warranted by the specific temperature characteristics of these products.

It is an object of the present invention to provide a reactor for such plasma-chemical processes which meets these requirements. It is another object of the present invention to provide a reactor for such plasma-chemical processes, including a reactor and a cooling portion, both of which reactor and cooling portions meet these requirements.

SUMMARY OF THE INVENTION

In accordance with the present invention, there is provided in the reactor means for forcing or injecting the reactant into the plasma gas stream, or plasma jet, after it has passed through the arc in an arc-chamber. Further in accordance with this invention, there is provided a cooling portion, downstream from said reactor, for cooling the reaction products obtained therefrom, which cooling portion includes further means for forcing or injecting a coolant into the plasma jet. Preferably, these means, in both the reactor and the cooling chambers, will comprise a series of nozzles disposed within the reactor and cooling chambers for the injection of reactants, and coolants, respectively, into the plasma jet as it travels therethrough. In a preferred embodiment, a series of reactors and cooling chambers are provided, with the initial such chamber, the closest to the arc, and a first series of such chambers downstream therefrom, being reactors, and the subsequent series downstream therefrom being the cooling chambers. When employing such a system, it is highly preferred that the nozzles be situated within each chamber so as to inject reactants and coolants, respectively, tangentially to the plasma jet, and most preferably in alternating clockwise and counter-clockwise directions in each successive chamber, so as to provide the most effective possible mixing, initially of reactants and plasma jet, and subsequently of coolant and plasma jet, now including reaction products.

DESCRIPTION OF THE PREFERRED EMBODIMENT

Figure 2:
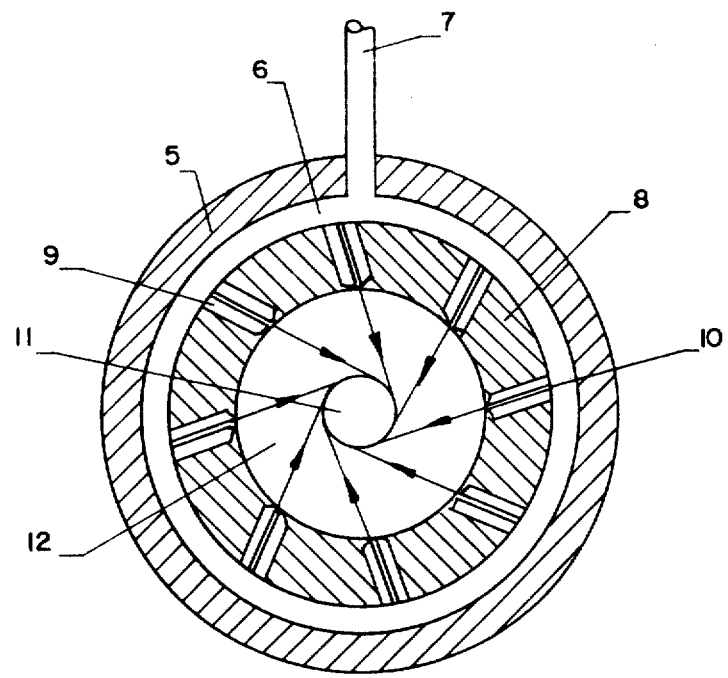
FIG. 2 is a transverse sectional view of a typical reactor or cooling chamber of the present invention.
Figure 1:
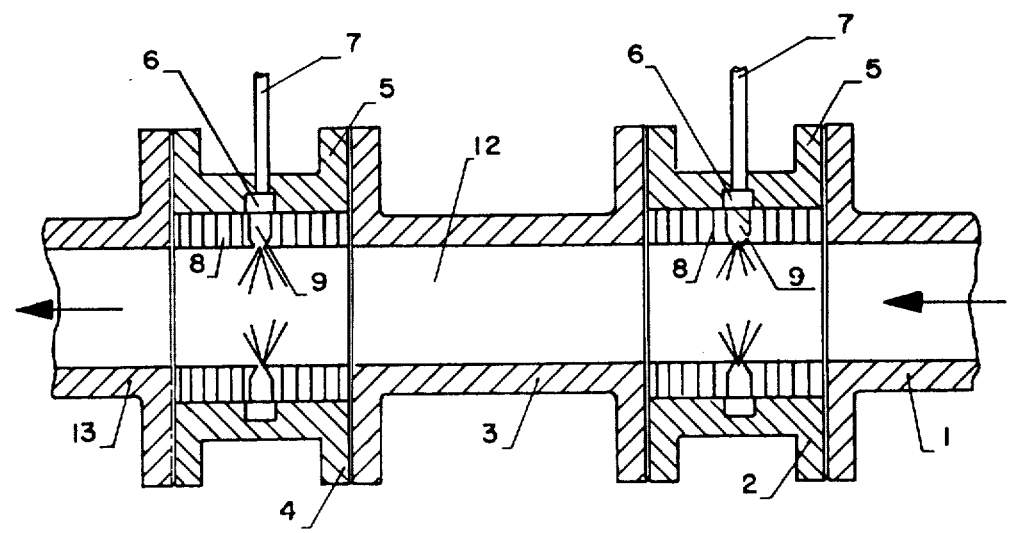
FIG. 1 is a longitudinal sectional view of a reactor and cooling chamber in accordance with the present invention.

Referring to FIG. 1, the reactor 2 is connected by conduit 1 to the arc chamber of the reactor. The reactor 2 itself, as can be seen from FIG. 2, comprises a tubular concentric inner reactor 8 and outer reactor 5, which thus provides a cylindrical interior portion 12 through which the plasma jet may pass. A series of nozzles 9 are provided within the walls of the inner reactor 8 for the injection of reactants within the reactor, and into the plasma jet passing therethrough. Preferably, the injection ducts 10 through which the reactant passes out of the nozzles 9 are directed in a manner such that the reactants, as they are injected into the interior of the reactor 12, strike the plasma jet with a tangential velocity component, as shown by the arrows within that portion 12 and FIG. 2. If a sufficient number of nozzles 9 are employed, it is possible to provide contact between the entire surface of the plasma jet with reactants injected thereinto. The spray of reactant passing from the injection duct 10 in each nozzle 9 may be provided either as a convergent jet, or in a conical manner, thus achieving a shower of reactant. Within the inner reactor 8 there is provided an annular distribution channel 6, for the distribution of reactants to the injection ducts 10 of each nozzle 9. A supply duct 7 is provided, passing through the outer reactor 5 and connecting with the annular distribution channel 6 for supply of reactant thereto.

Each reactor 2 thus operates in the following manner: The hot plasma gases, such as hydrogen, which have become partially ionized after being heated by the arc in the arc-chamber, pass through conduit 1 into an initial reactor 2. The reactants are supplied through supply duct 7, into annular distribution channel 6, and thus to the injection duct 10 of each nozzle 9. From each nozzle 9 a stream of reactant, in a more or less divergent stream, passes into the conical inner portion 12 of the reactor 2. As mentioned, effective mixing is thus achieved by regulating both the velocity of each reactant stream passing from the nozzle 9, and particularly by so directing each reactant stream so as to achieve maximum turbulence with the plasma jet with which the reactants are to react. Where, for example, the reactants are in a liquid form, the liquid droplets in the reactant streams passing from the nozzle 9 must have sufficient velocity and size in order to penetrate the moving plasma jet, but should not be of a droplet size which is so great that evaporation within a reasonable time cannot be obtained within the reactor, thus causing accumulation of reactant there within.

Referring again to FIG. 1, the plasma jet passing from the reactor 2, now including the reaction product, passes through conduit 3 to a cooling chamber 4. The length of the conduit 3 may be adapted to the desired cooling characteristics of the stream passing therethrough. Thus, for the quickest possible cooling of that stream, it may be desirable to eliminate the conduit 3 entirely. The cooling chamber 4 is constructed in a manner similar to that of the reactor 2 described above, and as pictured in FIG. 2. Again, the cooling chamber includes a cylindrical concentric inner cooling chambers 8 and outer cooling chambers 5, thus providing a cylindrical space 12 therewithin through which the plasma stream, including reaction products now passes. The cooling chamber 4 also includes a series of nozzles 9, provided within the walls of the inner cooling chamber 8, for the injection of coolant into the plasma stream passing therethrough. Each nozzle includes an injection duct 10, there within, for the supply of coolant, each injection duct 10 being connected to an annular distribution channel 6 within the outer cooling chamber 5, which in turn is connected to a supply duct 7 for supply of coolant through the outer cooling chamber 5 and into each nozzle 9 for injection into the cylindrical inner portion 12 thereof. Once again, the objective is to achieve the maximum possible mixing between the coolant, or cooling medium, and the plasma gas flow therethrough. The nozzles 9 are thus again arranged so that the maximum amount of turbulence will be achieved as the particles of cooling medium are directed into the plasma gas stream passing therethrough.

The flow of plasma gas, including reaction products, passing through the cooling chamber 4, and the preferred means of injecting coolant through each nozzle 9 thereinto, will be analogous to that described above with respect to the reactor 2. Thus, it is most preferred that the nozzle 9 be aligned so that each stream of coolant strikes the plasma gas stream with a tangential velocity component, for maximum mixing.

In another preferred embodiment of the present invention, a series of such reactors 2 and cooling chambers 4 is provided. Most preferably, the nozzles within the inner reactor 8 of each reactor 2, and within the walls of the inner cooling chambers 8 of each cooling chamber 4 will be provided in order to impart a tangential velocity component to the plasma gas stream passing therethrough, as described above, and preferably the tangential velocity component in each successive reactor 2 and cooling chamber 4 will be alternated, so that first clockwise, and subsequently counterclockwise components are imparted to the plasma gas stream passing therethrough, again for maximum mixing and turbulence within both the reactors and cooling chambers.

The reactor and cooling chambers described above are not meant to limit the present invention to those particular embodiments, but variations thereof are, of course, possible within the scope of this invention. Thus, the geometrical design of the reactor and cooling chambers can be altered, and furthermore, the arrangement of the nozzles can be altered within the scope of this invention, so long as significant mixing of both reactants and coolants is achieved within each. For example, the mixing effect can be further improved if either the reactants or coolants injected into the reactors 2 or cooling chambers 4, respectively, are given an additional axial velocity component with respect to the plasma gas stream passing therethrough.

What I claim is:

1. In a reactor for a plasma-chemical process, said reactor including an arc-chamber containing electrodes for the transmission of an arc therethrough, and means for supplying a plasma gas stream through said arc, the improvement which comprises a plurality of reactors provided downstream from said arc chamber for the receipt of said plasma gas stream, and a plurality of means for imparting alternating clockwise and counter-clockwise tangential velocity components to said plasma gas stream passing therethrough.

2. The reactor of claim 1 including a plurality of cooling chambers provided downstream from said arc chamber, and alternating with said plurality of reactors, and wherein said means for imparting alternating clockwise-and counter-clockwise tangential velocity components to said plasma gas stream are associated with said alternating reactors and cooling chambers, respectively.

3. The reactor of claim 2 wherein said means for imparting alternating clockwise and counter-clockwise tangential velocity components to said plasma gas stream comprise alternating reactant injection means and coolant injection means for the supply of reactant and coolant to said alternating reactors in cooling chambers.

4. The reactor of claim 3 wherein said reactant injection means includes a plurality of reactant nozzle means, and wherein said coolant injection means includes a plurality of coolant nozzle means.

* * * * *